(12) United States Patent
Gordeenko et al.

(10) Patent No.: US 10,308,142 B2
(45) Date of Patent: Jun. 4, 2019

(54) LOCKING DEVICE

(71) Applicant: JOHNSON CONTROLS GMBH, Burscheid (DE)

(72) Inventors: Igor Gordeenko, Frechen (DE); Andreas Vedder, Haan (DE); Patrick Handl, Köln (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 42 days.

(21) Appl. No.: 14/905,511

(22) PCT Filed: Jul. 16, 2014

(86) PCT No.: PCT/EP2014/065221
§ 371 (c)(1),
(2) Date: Jan. 15, 2016

(87) PCT Pub. No.: WO2015/007766
PCT Pub. Date: Jan. 22, 2015

(65) Prior Publication Data
US 2016/0152159 A1 Jun. 2, 2016

(30) Foreign Application Priority Data
Jul. 16, 2013 (DE) .......................... 10 2013 011 803

(51) Int. Cl.
*B60N 2/015* (2006.01)
*B60N 2/36* (2006.01)

(52) U.S. Cl.
CPC ......... *B60N 2/01583* (2013.01); *B60N 2/366* (2013.01)

(58) Field of Classification Search
CPC .... B60N 2/01583; B60N 2/366; B60N 2/305; B60N 2/3011; B60N 2/3047
USPC .......................................................... 292/216
See application file for complete search history.

(56) References Cited

U.S. PATENT DOCUMENTS

| | | | | |
|---|---|---|---|---|
| 6,012,747 A * | 1/2000 | Takamura | ............... | B60N 2/366 292/210 |
| 6,036,252 A * | 3/2000 | Hecksel | ............. | B60N 2/01583 296/63 |
| 6,945,585 B1 * | 9/2005 | Liu | .................... | B60N 2/01583 292/216 |
| 7,264,293 B2 * | 9/2007 | Fischer | ............... | B60N 2/01583 248/503.1 |
| 7,575,280 B2 * | 8/2009 | Palomba | ............ | B60N 2/01583 296/65.03 |
| 7,703,828 B2 * | 4/2010 | O'Connor | .......... | B60N 2/01583 296/65.01 |
| 7,926,858 B2 * | 4/2011 | Otsuka | ............... | B60N 2/01583 292/216 |

(Continued)

FOREIGN PATENT DOCUMENTS

DE 100 25 605 C1 9/2001
DE 102 61 689 A1 7/2004
(Continued)

Primary Examiner — Mark A Williams
(74) Attorney, Agent, or Firm — McGlew and Tuttle, P.C.

(57) ABSTRACT

A locking device is provided for a vehicle seat, for locking the back rest to a seat part and/or for locking the backrest to a body of a vehicle. The locking device uses a locking lever which can be moved from an unlocked position into a locked position in which it lockingly interacts with a bolt.

9 Claims, 2 Drawing Sheets

(56) References Cited

U.S. PATENT DOCUMENTS

| | | | | |
|---|---|---|---|---|
| 7,959,205 | B2* | 6/2011 | Paing | B60N 2/01583 296/65.03 |
| 8,128,135 | B2* | 3/2012 | Maeta | B60N 2/01583 292/201 |
| 8,282,141 | B2* | 10/2012 | Paing | B60N 2/01583 292/216 |
| 8,708,377 | B2* | 4/2014 | Ishikawa | B60N 2/01583 292/216 |
| 8,950,810 | B2* | 2/2015 | Dryburgh | B60N 2/01583 297/336 |
| 9,039,089 | B2* | 5/2015 | Ohba | B60N 2/2352 297/335 |
| 9,050,911 | B2* | 6/2015 | Wieclawski | B60N 2/2245 |
| 9,297,188 | B2* | 3/2016 | Mensch | E05C 3/30 |
| 9,637,027 | B2* | 5/2017 | Seigel | B60N 2/01583 |
| 2006/0113816 | A1 | 6/2006 | Fischer et al. | |

FOREIGN PATENT DOCUMENTS

| | | |
|---|---|---|
| DE | 203 04 508 U1 | 7/2004 |
| DE | 10 2005 047 731 A1 | 4/2007 |
| DE | 10 2007 054 765 A1 | 5/2009 |
| DE | 20 2011 100 040 U1 | 8/2011 |
| JP | 2007-508478 A | 4/2007 |
| JP | 2007-302 190 A | 11/2007 |
| JP | 2012 035651 A | 2/2012 |
| WO | 2005/037596 A2 | 4/2005 |
| WO | 2010/054860 A2 | 5/2010 |
| WO | 2013/021680 A1 | 2/2013 |

* cited by examiner

LOCKING DEVICE

CROSS REFERENCE TO RELATED APPLICATIONS

This application is a United States National Phase Application of International Application PCT/EP2014/065221 filed Jul. 16, 2014 and claims the benefit of priority under 35 U.S.C. § 119 of German Patent Application 10 2013 011 803.4 filed Jul. 16, 2013 the entire contents of which are incorporated herein by reference.

FIELD OF THE INVENTION

The present invention relates to a locking device for a vehicle seat for locking the backrest to a seat part and/or to the body of the vehicle, with a catch which is movable from an unlocked position into a locking position, in which said catch interacts in a locking manner with a pin.

BACKGROUND OF THE INVENTION

Locking devices of this type are well known from the prior art, for example from WO 2010/054860 A2 and DE 20 2011 100 040 U1.

SUMMARY OF THE INVENTION

It is an object of the present invention to improve the known locking devices with regard to security, convenience and/or producibility.

The object is achieved by a locking device for a vehicle seat for locking the backrest to a seat part and/or to the body of the vehicle, with a catch which is movable from an unlocked position into a locking position, in which said catch interacts in a locking manner with a pin, wherein the catch moves in a rotatory and translatory manner during its movement from the unlocking position to the locking position and vice-versa.

The statements made with regard to this subject matter of the present invention apply equally to the other subject matter, and vice-versa.

The present invention relates to a locking device for a vehicle seat. Said locking device is used, for example, to lock the backrest to the seat part or to the body of the vehicle. The lock according to the invention has a catch which is provided, for example, on the backrest and which, in the locking position thereof, interacts with a pin which is arranged, for example, on the seat part of the vehicle seat or on the body of the vehicle. According to the invention, the catch is now designed and/or mounted in such a manner that said catch executes both a translatory and a rotatory movement during the closing movement thereof. As a result, the form-fitting and/or frictional connection between the pin and the catch can be improved and possible tolerances can be better compensated for.

For example, the locking device has a sleeve about which the catch rotates. The catch preferably has an elongated hole in which, particularly preferably, the sleeve engages. By means of the combination of sleeve/elongated hole, the catch can carry out a rotative movement about the sleeve and a translatory movement along the elongated hole.

The locking device preferably has a spring means which prestresses the catch in a rotatory and translatory manner in the direction of the locking position thereof.

A further subject matter according to the invention or preferred subject matter of the present invention is a locking device which has a receiving lever with an actuating means, which receiving lever is mounted rotatably on a bearing means, in particular a bearing bush, wherein the pin drives the receiving lever during the transition into the locking position.

The statements made with regard to this subject matter of the present invention apply equally to the other subject matter, and vice-versa.

The rotation of the actuating means preferably at least temporarily drives the catch and brings the latter in particular from a locking position, in which said catch is in engagement with the pin, into an unlocked position. Particularly preferably, the actuating means holds the catch in this position. Conversely, the actuating means releases the catch again preferably in a certain position so that said catch can enter into engagement again with the pin.

The locking device preferably has a clamping means, in particular a clamping eccentric, which clamping means/clamping eccentric interacts with the catch and clamps the latter against the pin and/or the receiving lever. The clamping means preferably only enters into engagement with the catch after the latter is already in the locking position thereof, i.e. is already in engagement with the pin and/or is already in the direct vicinity of the pin. Particularly preferably, the clamping means moves the catch in a translatory manner.

The locking device preferably has a means which triggers a movement of the clamping means. A movement of the clamping means is preferably triggered only when the catch is already in engagement with the pin.

In a preferred embodiment of the present invention, the clamping means and the receiving lever are provided rotatably about the same bearing means, wherein the clamping means and the receiving lever are provided rotatably about said bearing means preferably at least partially independently of each other. A bearing bush is preferably involved here.

However, two separate axes of rotation and/or bearing means for the receiving lever and clamping means can also be provided, for example in order to obtain a different rotational movement.

A spring means is preferably provided between the clamping means and the receiving lever, said spring means clamping the clamping means and the receiving lever in a manner rotating in opposite directions. The spring means is preferably a torsion spring, the one limb of which bears against the clamping means and the other limb of which bears against the receiving lever. By rotation of the actuating lever, the clamping means is also rotated, preferably via the driver, and, as a result, the spring force on the receiving lever is increased or reduced.

The clamping means preferably clamps the pin between the catch and the receiving lever.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
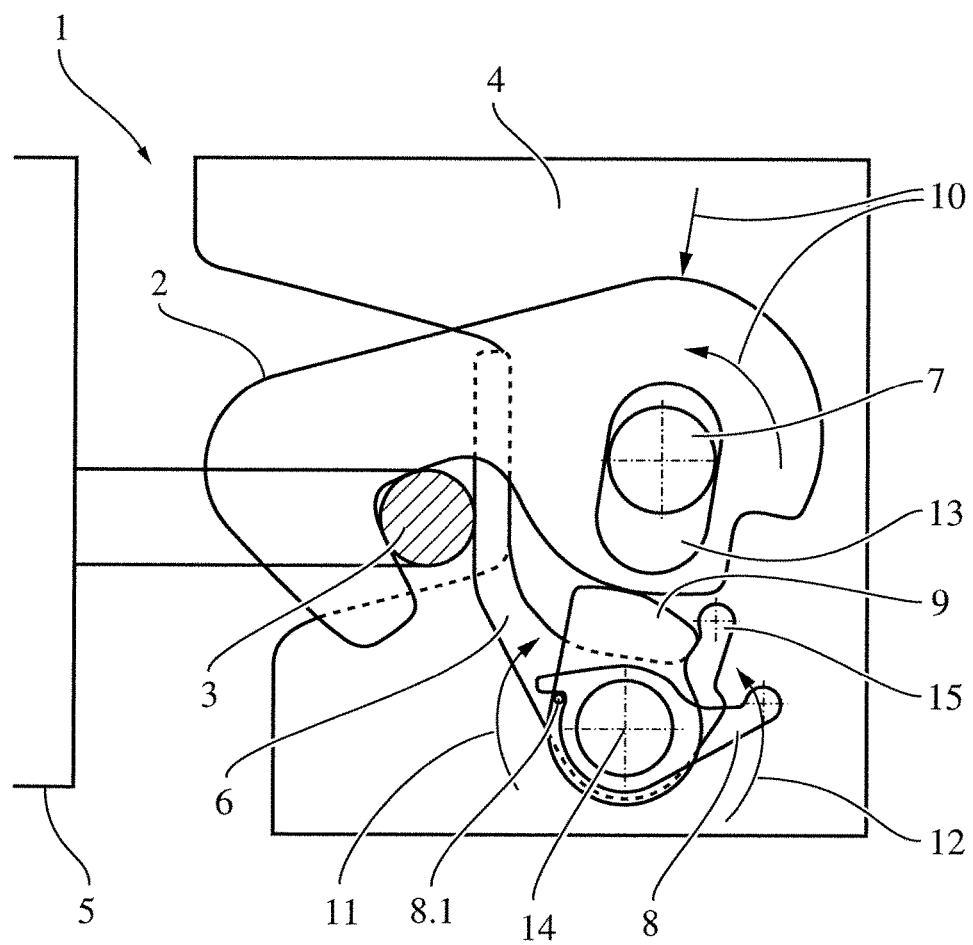
FIG. 1 is a partially sectional view showing the locking device according to the invention.

FIG. 1 shows the locking device 1 according to the invention which has a catch 2 which, in the locking state illustrated, is in engagement in a frictional and/or form-fitting manner with a pin and thereby prevents a first part 4, for example a backrest, from moving relative to a second part 5, for example a seat part. The catch 2 is mounted rotatably on a bearing means 7, in particular a bearing bush 7. Furthermore, the catch 2 has an elongated hole 13, and therefore said catch cannot only carry out a rotatory movement but also a translatory movement. The bearing means 7 preferably engages in the elongated hole 13. The locking device preferably has a spring means, the direction of action of which is symbolized by the reference sign 10, that is to say, said spring means pretensions the catch in such a manner that, because of the spring force, said catch wants to execute both a translatory and rotatory movement in order to enter into engagement with the pin 3. In addition, the locking device has a, preferably two-limbed, receiving lever 6, wherein the second limb is a blocking limb 15. The receiving lever is provided rotatably about a bearing means 14, here a bearing bush 14. Furthermore, the locking device has an actuating means, here an actuating lever 8, which is preferably likewise mounted rotatably on the bearing means 14. A clamping means 9, preferably a clamping eccentric 9, is preferably provided, likewise rotatably, on the same bearing means, said clamping means, in the locked state, being in engagement with the catch 2 and moving the latter, preferably displacing the latter in a translatory manner such that the form-fitting connection and/or frictional connection between the pin and the catch, in particular the lug of the latter, is improved. The movement of the clamping means 9 is at least temporarily independent of the movement of the actuating lever 8. A further spring means, in particular a torsion spring, the direction of action of which is identified by the arrows with the reference signs 11, 12, is preferably provided in the region of the bearing means 14, that is to say one limb pretensions the clamping means 9 here in a manner rotating in the clockwise direction and one limb pretensions the receiving lever 6, here in a manner rotating counterclockwise. By means of the movement of only one element 6, 9, the pretensioning force on the other element 6, 9 is increased or reduced by the spring means.

The locking of the locking device according to the invention is now explained with reference to FIGS. 2a-2e.

Figure 2A:
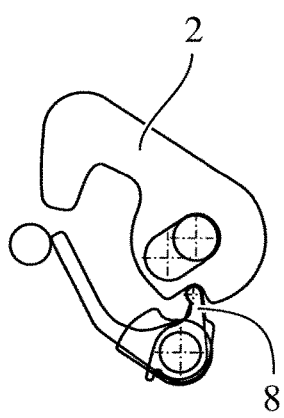
FIG. 2a is a view of the locking of the locking device according to the invention in a state.
Figure 2B:
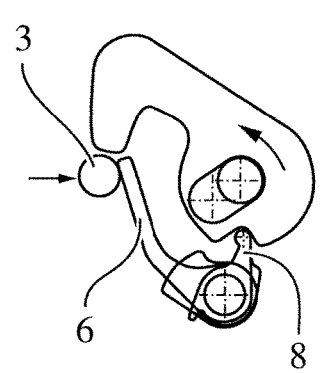
FIG. 2b is a view of the locking of the locking device according to the invention in another state.
Figure 2C:
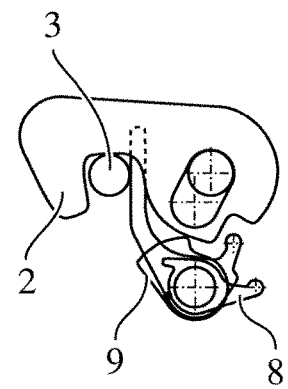
FIG. 2c is a view of the locking of the locking device according to the invention in another state.
Figure 2D:
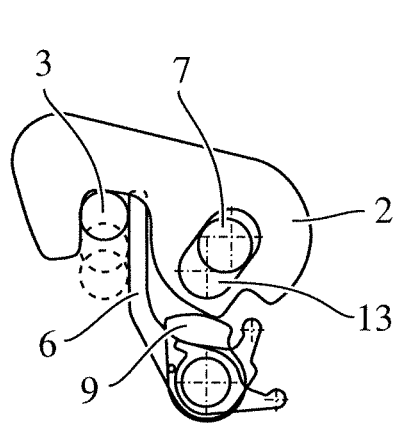
FIG. 2d is a view of the locking of the locking device according to the invention in another state.
Figure 2E:
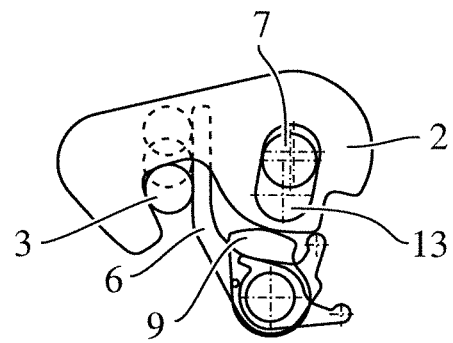
FIG. 2e is a view of the locking of the locking device according to the invention in another state.

FIG. 2a shows the locking device according to the invention in the unlocked state. The catch 2 and the actuating lever 8 are held in an unlocked position by the locking limb 15 of the receiving lever 6. The receiving lever 6 preferably bears against the pin 3. If the locking of the locking device is now initiated, then the pin 3 presses, as illustrated by the horizontal arrow, against the receiving lever 6 such that the latter, and therefore the actuating means 8, rotates in the clockwise direction about the rotary bearing 14. As a result, rotation of the catch 2, here counterclockwise, which rotation is brought about by the spring force, is enabled, which is likewise symbolized by a curved arrow (cf. FIG. 2b). As soon as the catch 2 bears against the bearing pin 3 (cf. FIG. 2c), a movement of the clamping means 9, here of the clamping eccentric, is triggered, in a manner rotating in the clockwise direction, by means of the spring force 11. As a result, the catch 2, as can be seen in FIGS. 2d and 2e, is moved in a translatory manner along the elongated hole 13 and/or in a rotatory manner about the bearing 7, and the engagement between the catch 2 and the pin 3 and thereby also the force flux between said two parts are improved further. In particular, the bearing pin 3 is clamped in a play-free manner between the lug of the catch 2 and the receiving lever 6.

The unlocking takes place the other way around. When the actuating lever is actuated, the clamping element is first of all rotated counterclockwise, for example via a driver. The catch is then rotated in the direction of the unlocking position thereof. As soon as the catch has released the pin, the receiving lever rotates counterclockwise because of the spring force 12 and the locking limb 15 of said receiving lever rotates the catch further into the unlocking end position thereof.

Figure 3:
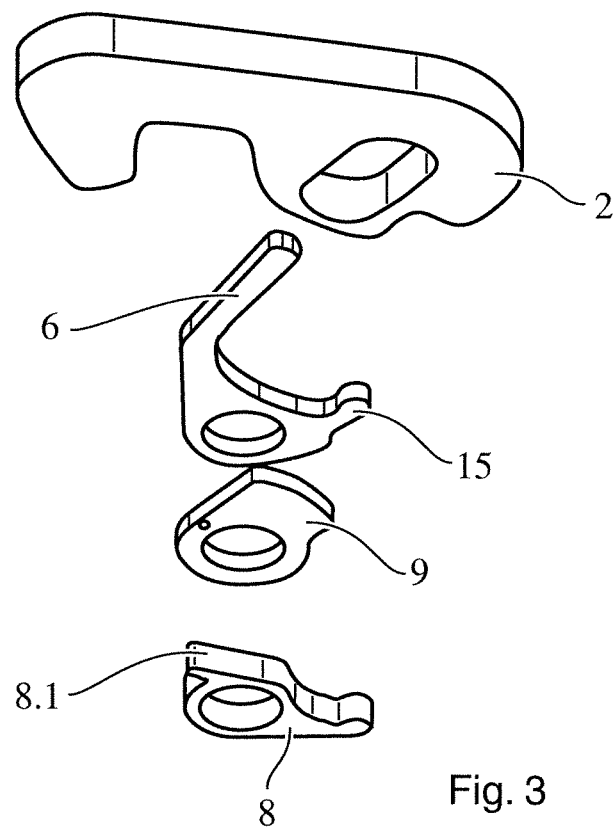
FIG. 3 is an exploded drawing of the locking device.

FIG. 3 shows an exploded illustration of the locking device. All of the elements 2, 6, 8, 9, 15 which are illustrated are mounted rotatably about the bearing means 14. The receiving lever 6 and the blocking limb 15 are provided preferably integrally. The same preferably applies to the actuating means 8 and the driver 8.1.

While specific embodiments of the invention have been shown and described in detail to illustrate the application of the principles of the invention, it will be understood that the invention may be embodied otherwise without departing from such principles.

The invention claimed is:

1. A locking device for a vehicle seat for locking the backrest to a seat part or to a body of a vehicle or to both the seat part and the body of a vehicle, the locking device comprising:
    a pin;
    a catch which is movable from an unlocked position into a locking position, in which said catch interacts in a locking manner with the pin, wherein the catch moves with a rotatory motion and a translatory motion during catch movement from the unlocking position to the locking position and vice-versa;
    a bearing bush;
    a receiving lever with an actuating means, the receiving lever and the actuating means being mounted rotatably on the bearing bush, the catch having an elongated hole in which the bearing bush is provided, wherein the pin moves the receiving lever during the transition into the locking position; and
    a clamping means, which interacts with the catch and clamps the latter against the pin or the receiving lever or both the pin and the receiving lever, wherein a spring means, which provides a first spring force, acts on the clamping means, and the spring means provides a second spring force which acts on the receiving lever, the first spring force and the second spring force acting in opposite directions.

2. The locking device as claimed in claim 1, wherein the catch is pretensioned in a rotatory and translatory manner in the direction of the locking position thereof.

3. The locking device as claimed in claim 1, wherein the rotation of the actuating means at least temporarily moves the catch.

4. The locking device as claimed in claim 1, further comprising a trigger means which triggers a movement of the clamping means.

5. The locking device as claimed in claim 1, wherein only a portion of the bearing bush is in contact with the catch.

6. The locking device as claimed in claim 1, wherein a portion of the bearing bush is located at a spaced location from the catch.

7. A locking device for a vehicle seat for locking the backrest to a seat part or to a body of a vehicle or to both the seat part and the body of a vehicle, the locking device comprising:
   a pin;
   a catch which is movable from an unlocked position into a locking position, in which the catch interacts in a locking manner with the pin, wherein the catch moves with a rotatory motion and a translatory motion during catch movement from the unlocking position to the locking position and vice-versa;
   a first bearing bush, the catch having an elongated hole in which the first bearing bush is provided;
   a receiving lever with an actuating means, the receiving lever and the actuating means being mounted rotatably on a second bearing bush, wherein the pin moves the receiving lever during the transition into the locking position; and
   a clamping means, which interacts with the catch and clamps the catch against the pin or the receiving lever or both the pin and the receiving lever, wherein the clamping means and the receiving lever are provided rotatably about the second bearing bush.

8. The locking device as claimed in claim 7, wherein only a portion of the bearing bush is in contact with the catch.

9. The locking device as claimed in claim 7, wherein a portion of the bearing bush is located at a spaced location from the catch.

\* \* \* \* \*